United States Patent
Hoegele et al.

(10) Patent No.: US 9,715,097 B2
(45) Date of Patent: Jul. 25, 2017

(54) STEREOMICROSCOPE HAVING A MAIN OBSERVER BEAM PATH AND A CO-OBSERVER BEAM PATH

(71) Applicant: Carl Zeiss Meditec AG, Jena (DE)

(72) Inventors: Artur Hoegele, Oberkochen (DE); Andre Mueller, Koenigsbronn-Zang (DE); Daniel Kolster, Oberkochen (DE)

(73) Assignee: Carl Zeiss Meditec AG, Jena (DE)

( * ) Notice: Subject to any disclaimer, the term of this patent is extended or adjusted under 35 U.S.C. 154(b) by 12 days.

(21) Appl. No.: 14/749,358

(22) Filed: Jun. 24, 2015

(65) Prior Publication Data

US 2015/0370059 A1 Dec. 24, 2015

(30) Foreign Application Priority Data

Jun. 24, 2014 (DE) .................. 10 2014 108 811

(51) Int. Cl.
| | |
|---|---|
| *G02B 21/22* | (2006.01) |
| *G02B 21/00* | (2006.01) |
| *G02B 21/02* | (2006.01) |
| *G02B 21/04* | (2006.01) |
| *G02B 21/18* | (2006.01) |

(52) U.S. Cl.
CPC ......... *G02B 21/22* (2013.01); *G02B 21/0012* (2013.01); *G02B 21/025* (2013.01); *G02B 21/04* (2013.01); *G02B 21/18* (2013.01)

(58) Field of Classification Search
CPC ......... G02B 21/18; G02B 21/20; G02B 21/22
USPC .................................. 359/372–378
See application file for complete search history.

(56) References Cited

U.S. PATENT DOCUMENTS

| | | | | |
|---|---|---|---|---|
| 4,640,588 A | * | 2/1987 | Tanaka | G02B 21/22 359/377 |
| 4,763,968 A | * | 8/1988 | Minami | G02B 21/22 359/377 |
| 5,612,817 A | * | 3/1997 | Strahle | G02B 15/163 359/363 |

(Continued)

FOREIGN PATENT DOCUMENTS

| | | | |
|---|---|---|---|
| DE | 10336476 A1 | * 3/2005 | ............ G02B 21/22 |
| DE | 10 2004 049 368 A1 | 4/2006 | |

(Continued)

OTHER PUBLICATIONS

English machine translation of DE 10336476 A1.*

*Primary Examiner* — Thomas K Pham
*Assistant Examiner* — Nicholas R Pasko
(74) *Attorney, Agent, or Firm* — Walter Ottesen, P.A.

(57) ABSTRACT

A stereomicroscope includes a stereoscopic main observer beam path having a main observer zoom system, a stereoscopic co-observer beam path having a co-observer zoom system, and a main objective common to the main observer beam path and the co-observer beam path. The co-observer beam path is coupled out from the main observer beam path via a geometrical beam splitter arranged between the main objective and the main observer zoom system, wherein in the co-observer beam path the co-observer zoom system succeeds the geometrical beam splitter and is constructed from lenses having dimensions such that both a first and a second stereoscopic partial beam of the co-observer beam path in each case pass through the lenses.

14 Claims, 5 Drawing Sheets

(56) References Cited

U.S. PATENT DOCUMENTS

| | | | |
|---|---|---|---|
| 5,991,090 A | 11/1999 | Strahle | |
| 6,304,374 B1* | 10/2001 | Hanzawa | G02B 21/22 359/368 |
| 6,473,229 B2 | 10/2002 | Nakamura | |
| 6,525,787 B1 | 2/2003 | Sato | |
| 6,853,494 B2* | 2/2005 | Sander | G02B 15/173 359/368 |
| 7,468,835 B2 | 12/2008 | Luecke et al. | |
| 7,538,940 B2* | 5/2009 | Merz | G02B 21/18 359/372 |
| 7,978,404 B2 | 7/2011 | Reimer et al. | |
| 7,990,610 B2 | 8/2011 | Higuchi et al. | |
| 8,547,633 B2 | 10/2013 | Abele et al. | |
| 2006/0023300 A1* | 2/2006 | Sander | G02B 21/22 359/376 |
| 2006/0176550 A1* | 8/2006 | Luecke | G02B 21/18 359/380 |
| 2009/0180178 A1 | 7/2009 | Luecke et al. | |
| 2011/0032335 A1 | 2/2011 | Sander | |

FOREIGN PATENT DOCUMENTS

| | | |
|---|---|---|
| JP | 2005-70809 A | 3/2005 |
| JP | 2013-33288 A | 2/2013 |
| JP | 2013-101238 A | 5/2013 |

\* cited by examiner

STEREOMICROSCOPE HAVING A MAIN OBSERVER BEAM PATH AND A CO-OBSERVER BEAM PATH

CROSS REFERENCE TO RELATED APPLICATION

This application claims priority of German patent application no. 10 2014 108 811.5, filed Jun. 24, 2014, the entire content of which is incorporated herein by reference.

FIELD OF THE INVENTION

The present invention relates to a stereomicroscope and more particularly a surgical microscope including a stereoscopic main observer beam path, a stereoscopic co-observer beam path and a main objective common to the main observer beam path and the co-observer beam path.

BACKGROUND OF THE INVENTION

JP 2005-070809 A discloses a stereomicroscope having a main observer beam path and a plurality of co-observer beam paths. In the stereomicroscope there exist a co-observer beam path which is coupled out from the main observer beam path in front of the main objective, that is, between main objective and observation object, and co-observer beam paths which are coupled out behind the main objective. The latter share with the main observer beam path not only the main objective but also a zoom system including dedicated lenses for each stereoscopic partial beam path. Binocular tubes for the co-observer beam paths can be connected to interfaces of the microscope housing that are provided for this purpose. In this case, there are interfaces for face-to-face positioning of main observer and co-observer, which involves main observer and co-observer being situated opposite one another, and interfaces for lateral positioning of the co-observer, which involves main observer and co-observer being situated at an angle of 90 degrees with respect to one another. Other co-observer positions are not possible in the case of the co-observer beam paths.

The co-observer beam path which is coupled out between main objective and observation object in the stereomicroscope from JP 2005-070809 A can be rotated about the optical axis of the main objective of the main observer beam path, such that arbitrary positioning of the co-observer relative to the main observer is possible, in principle. However, since this co-observer beam path is already coupled out in front of the main objective of the main observer beam path, it necessitates a dedicated main objective, which increases the complexity and, in association therewith, the production costs for the co-observer beam path. In addition, the beam splitter arranged between the observation object and the main objective results in loss of light in the main observer beam path and thus in a reduction of the image quality for the main observer. Finally, the stereomicroscope described in JP 2005-070809 A takes up a relatively large amount of space if the co-observer beam path which is coupled out between the main objective of the main observer beam path and the observation object is used.

U.S. Pat. No. 6,304,374 B1 describes a stereomicroscope including a main objective, a zoom system, a main observer beam path and a co-observer beam path. The co-observer beam path therein is coupled out from the main observer beam path behind the zoom system, such that the main observer beam path and the co-observer beam path share not only the main objective but also the zoom system. The zoom system in U.S. Pat. No. 6,304,374 B1 is embodied as a large zoom system, that is, the lens diameters of the zoom system are of a magnitude such that both stereoscopic partial beam paths of the main observer beam path pass through each of the lenses. In comparison with a zoom system in which a dedicated partial zoom system is present for each partial beam path, a zoom system through which both stereoscopic partial beam paths pass must have a larger dimensioning in the direction of the optical axis, referred to hereinafter as longitudinal dimensioning, since otherwise the requirements made of the precision of the lenses used and the precision of the alignment increase to such a great extent that the production costs are significantly higher than with the use of separate zoom systems for the stereoscopic partial beam paths. However, the large zoom system affords the possibility of being able to freely choose the orientation of the stereo base, that is, the orientation of the connecting line between the midpoints of the stereoscopic partial beams within a plane perpendicular to the optical axis, even after passage through the zoom system. If this is intended to be possible for a co-observer as well, the co-observer beam path behind the zoom system must be coupled out from the main observer beam path via a beam splitter that is large enough that the stereoscopic partial beam paths can be coupled out from the main observer beam path in any orientation of the stereo base. This results in loss of light in the main observer beam path and thus in a reduction of the image quality for the main observer.

The possibility of freely orienting the co-observer beam path in a large angular range is thus purchased at the expense of a reduction in the image quality for the main observer in JP 2005-070809 A and in U.S. Pat. No. 6,304,374 B1.

SUMMARY OF THE INVENTION

It is an object of the invention to provide an advantageous stereomicroscope, more particularly an advantageous surgical microscope.

The stereomicroscope of the invention includes: a stereoscopic main observer beam path having a main observer zoom system; a stereoscopic co-observer beam path having a co-observer zoom system and being configured to have a first stereoscopic co-observer partial beam and a second stereoscopic co-observer partial beam pass therealong; a main objective common to the main observer beam path and the co-observer beam path; a geometrical beam splitter arranged between the main objective and the main observer zoom system; the co-observer beam path being coupled out from the main observer beam path via the geometrical beam splitter; the co-observer zoom system being disposed in the co-observer beam path downstream of the geometrical beam splitter; and, the co-observer zoom system including a plurality of lenses having dimensions configured so as to have both the first and the second stereoscopic co-observer partial beams pass through the lenses.

A stereomicroscope according to the invention, which can be embodied more particularly as a surgical microscope, but also as a scientific microscope, has a stereoscopic main observer beam path, a stereoscopic co-observer beam path, and also a main objective common to the main observer beam path and to the co-observer beam path. Both the stereoscopic main observer beam path and the stereoscopic co-observer beam path have a respective zoom system, which are designated hereinafter as main observer zoom system and co-observer zoom system for the sake of better differentiation. The co-observer beam path is coupled out from the main observer beam path via a geometrical beam splitter arranged between the main objective and the main observer zoom system. In this case, a geometrical beam splitter should be considered to be a beam splitter in which the co-observer beam path is coupled out from a region of the beam emerging from the main objective which does not overlap the main observer beam path. In the co-observer beam path the co-observer zoom system succeeds the geometrical beam splitter. The co-observer zoom system is constructed from lenses having dimensions such that both a first and a second stereoscopic partial beam of the co-observer beam path in each case pass through the lenses. In other words, the co-observer zoom system is embodied as a large zoom system.

In comparison with the prior art described in the introduction, the use of the geometrical beam splitter enables the beam emerging from the main objective to be split between the main observer beam path and the co-observer beam path in each case without loss of light for the stereoscopic partial beam paths. In addition, the use of a large co-observer zoom system makes it possible to select the orientation of the coupling-out and thus the orientation of the co-observer relative to the main observer even downstream of the co-observer zoom system, without the zoom system having to be rotated. In this case, the selection of the orientation can be carried out, for example, via a suitably oriented reflector disposed downstream of the co-observer zoom system. The invention therefore makes it possible to produce a flexibly usable surgical microscope in which the orientation of the co-observer can be defined even after the passage of the co-observer beam through the zoom system wherein, on account of the fact that no physical beam splitter need be used, no appreciable loss of light arises either for the main observer or for the co-observer. The high flexibility can therefore be achieved without losses in the image quality. Overall, the ergonomics of the stereomicroscope are increased as a result. Moreover, the use of a respective dedicated zoom system for the main observer beam path and for the co-observer beam path affords the advantage that the magnification is individually settable for main observer and co-observer.

In one advantageous development of the stereomicroscope according to the invention, the main observer zoom system is constructed from two partial zoom systems arranged alongside one another, wherein different stereoscopic partial beams of the main observer beam path pass through each of the partial zoom systems. In this way, a zoom system having relatively compact longitudinal dimensioning can be realized for the main observer.

The co-observer zoom system advantageously has an input arm and an output arm and also an optical axis that is folded by a folding angle of greater than zero via a beam deflector. The optical axis in the output arm of the co-observer zoom system and the optical axis in the input arm of the co-observer zoom system then form the folding angle. In this case, the folding angle should be considered to be the angle between the original course direction of the optical axis upstream of the beam deflector and the new course direction of the optical axis downstream of the beam deflector. Moreover, the co-observer zoom system has at least three lenses, at least two of which are arranged displaceably along the folded optical axis. Here in each case at least one of the at least three lenses is arranged both in the input arm and in the output arm. As a result of the folding of the large co-observer zoom system, the co-observer beam path can be embodied spatially more compactly, such that the eyepieces of the co-observer beam path can be brought closer to the main objective of the stereomicroscope in comparison with an extended large co-observer zoom system. As a result, the distance between main observer and co-observer can be reduced, which is of importance in the case of surgical microscopes, in particular, wherein the co-observer generally assists the main observer and the distance between main observer and co-observer must therefore not be excessively large.

In the folded zoom system, in particular folding angles in the range of 75 degrees to 180 degrees are possible, preferably folding angles in the range of 80 degrees to 100 degrees. In particular, a folding angle of 90 degrees is possible.

In an embodiment that is advantageous with regard to the imaging quality in the co-observer beam path, the co-observer zoom system has four lenses arranged one behind another along the folded optical axis, of which lenses two are arranged in the input arm and two in the output arm of the zoom system. In this case, it is advantageous if the two central lenses are arranged displaceably along the folded optical axis.

With regard to the production of the co-observer zoom system, it is advantageous if, as viewed from the input arm to the output arm the first lens and the fourth lens of the co-observer zoom system and also the second lens and third lens of the co-observer zoom system are embodied in each case identically to one another. In this way, the four-lens co-observer zoom system affords the possibility of restricting the production of the optical components of the zoom system to the production of two different lenses and of simultaneously ensuring a good optical imaging quality. With the four lenses, the co-observer zoom system can be constructed in a mirror-inverted fashion, in particular, such that the fourth lens is oriented oppositely to the first lens as viewed in the direction of the optical axis and the third lens is oriented oppositely to the second lens as viewed in the direction of the optical axis.

A four-lens zoom system in which both the input arm and the output arm in each case have two lenses enables a relatively short structural length even in the extended state of the zoom system, such that the folded zoom system can be embodied particularly compactly. In addition, a symmetrical construction of the zoom system enables very good connection of off-axis image aberrations, such as, for example, chromatic difference of magnification, tangent distortion and coma, via an approximately central pupil position in each magnification position. Details concerning the lenses of a symmetrical zoom system are described in U.S. Pat. No. 5,991,090. Such lenses can also be used in the folded zoom system of the present invention. Reference is therefore made to U.S. Pat. No. 5,991,090 with regard to possible structural details of the lenses of the zoom system.

In one particular advantageous embodiment of the stereomicroscope according to the invention, a reflector that is rotatable about the optical axis in the output arm of the co-observer zoom system is displaced downstream of the co-observer zoom system. The reflector can be embodied either as a mirror or as a reflection prism. Since the beam emerging from the output arm of the co-observer zoom system has not yet been split into two stereoscopic beams, it is symmetrical about the optical axis. This makes it possible to generate stereoscopic partial beams in any arbitrary orientation of their stereo base with the aid of the reflector. As a result, it becomes possible to position the binocular tube for a co-observer continuously variably in a wide angular range relative to the binocular tube of the main observer. In this regard, it is generally possible to realize at least a continuously variably free selectability of the orientation between a lateral co-observation on the right-hand side and a lateral co-observation on the left-hand side, wherein the co-observer can assume any arbitrary position between these two extrema. The co-observer thus has an orientation range of 180 degrees. Larger orientation ranges are also possible, in principle although structural details of the stereomicroscope can restrict the orientation range for the co-observer.

While the large co-observer zoom system in the stereomicroscope according to the invention is preferably a folded zoom system, the main observer zoom system is preferably an extended zoom system, that is, a zoom system without a folded optical axis. On account of the fact that the main observer zoom system for each stereoscopic partial beam path has a dedicated zoom system having considerably reduced lens diameters in comparison with the co-observer zoom system, the distance between the outer lenses of the zoom system can be significantly reduced in comparison with the large zoom system of the co-observer beam path. Folding is therefore not necessary. Consequently, it is also possible to dispense with a beam deflector in the main observer zoom system, such that the number of optical components can be kept small. Since the main observer beam path also need not be embodied in a rotatable fashion, the use of a large main observer zoom system would also not entail any direct advantages.

In one particular embodiment of the stereomicroscope according to the invention, in the co-observer beam path there is a splitter for separating the stereoscopic partial beams of the co-observer beam path. An intermediate imaging system is then arranged between the co-observer zoom system and the splitter, which intermediate imaging system images the device pupil of the co-observer beam path onto an input end of the splitter. The intermediate imaging system can include in particular a first converging lens or a first converging lens system, a second converging lens or a second converging lens system, and an intermediate image plane situated between the first converging lens or the first converging lens system and the second converging lens or the second converging lens system. The imaging of the device pupil onto the input end of the splitter makes it possible to avoid vignetting in the co-observer beam path.

In one advantageous development of the particular embodiment of the stereomicroscope according to the invention, an image erecting system is assigned to the intermediate imaging system. On account of the image erecting system, the image at the input of the binocular tube of the co-observer beam path is then directed in the same way as at the input of the binocular tube of the main observer beam path despite the additional intermediate image in comparison with the main observer beam path. In this development, a binocular tube that is structurally identical to the main observer beam path can therefore be used in the co-observer beam path.

BRIEF DESCRIPTION OF THE DRAWINGS

The invention will now be described with reference to the drawings wherein.

DESCRIPTION OF THE PREFERRED EMBODIMENTS OF THE INVENTION

The stereomicroscope according to the invention is described below on the basis of the example of a surgical microscope. In this case, FIG. 1 shows the basic construction of a surgical microscope such as can substantially be realized in particular in the main observer beam path of the stereomicroscope according to the invention.

Figure 1:
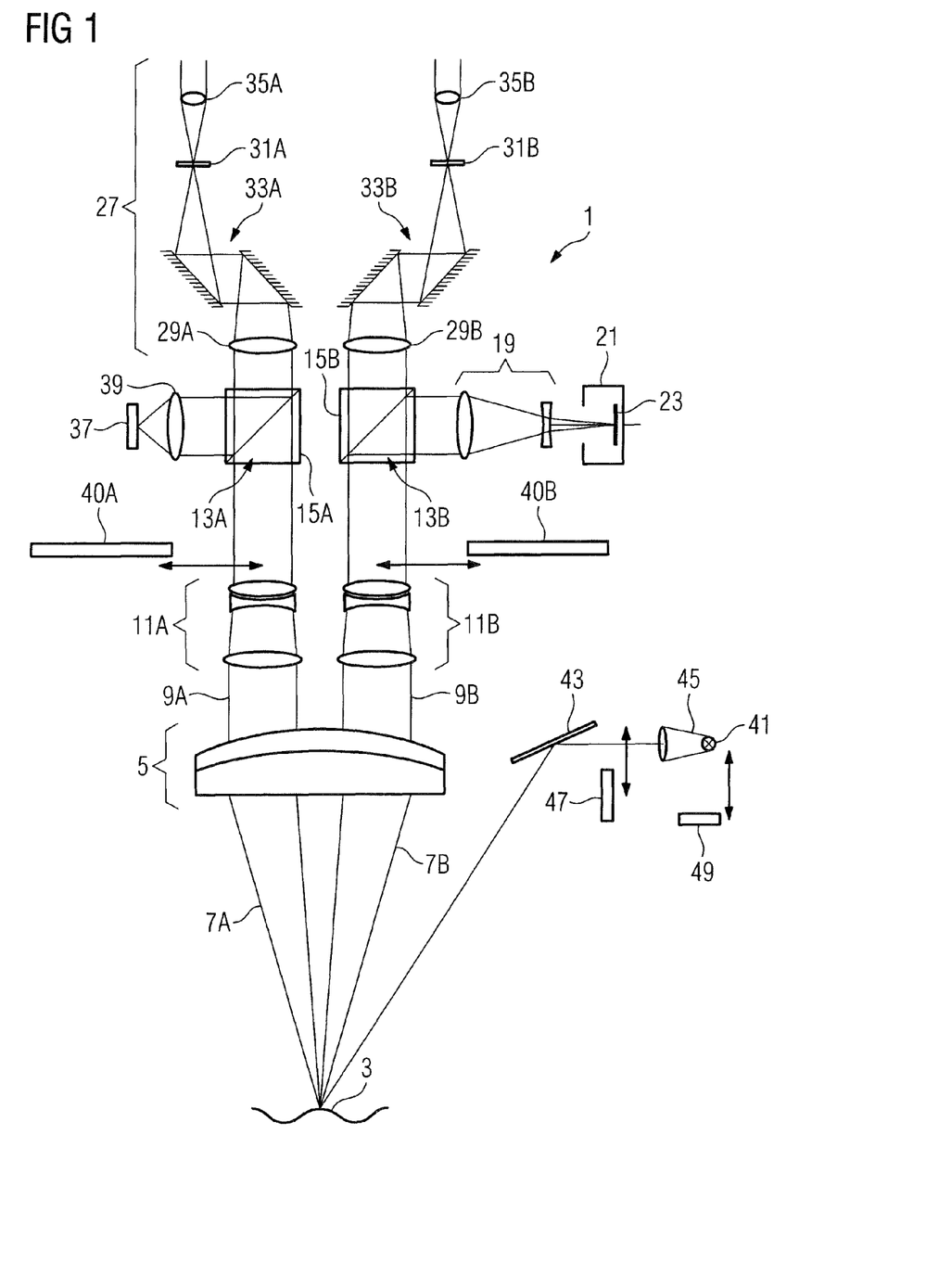
FIG. 1 shows the optical components in the main observer beam path of a surgical microscope in a schematic.

The surgical microscope 1 shown in FIG. 1 includes as essential constituents an objective 5 intended to face an object field 3, which objective can be embodied in particular as an achromatic or apochromatic objective. In the present embodiment, the objective 5 consists of two partial lenses cemented to one another, which form an achromatic objective. The object field 3 is arranged in the focal plane of the objective 5, such that it is imaged toward infinity by the objective 5. In other words, a divergent beam 7 emerging from the object field 3 is converted into a parallel beam 9 as it passes through the objective 5.

A magnification changer (11A, 11B) is arranged on the observer side of the objective 5, which magnification changer can be embodied either—as in the embodiment illustrated—as a zoom system for continuously variably changing the magnification factor or as a so-called Galilean changer for changing the magnification factor in a stepwise manner. In a zoom system constructed, for example, from a lens combination including three lenses, the two object-side lenses can be displaced in order to vary the magnification factor. In actual fact, however, the zoom system can also have more than three lenses, for example, four or more lenses, wherein the outer lenses can then also be arranged in a fixed manner. In a Galilean changer, by contrast, there exist a plurality of fixed lens combinations which represent different magnification factors and can be introduced into the beam path alternately. Both a zoom system and a Galilean changer convert an object-side parallel beam into an observer-side parallel beam having a different beam diameter. The magnification changer (11A, 11B) in the main observation beam path of the stereomicroscope according to the invention is generally already part of the binocular beam path, that is, it has a dedicated lens combination for each stereoscopic partial beam path (9A, 9B) of the surgical microscope 1.

Adjacent to the magnification changer (11A, 11B) from the observer side there is an interface arrangement (13A, 13B), via which external devices can be connected to the surgical microscope 1 and which includes beam splitter prisms (15A, 15B) in the present embodiment. In principle, however, other types of beam splitters can also be used, for example, partly transmissive mirrors. In the present embodiment, the interfaces (13A, 13B) serve for coupling out a beam from the beam path of the surgical microscope 1

(beam splitter prism 15B) and for coupling a beam into the beam path of the surgical microscope 1 (beam splitter prism 15A).

In the present embodiment, the beam splitter prism 15A in the partial beam path 9A serves, with the aid of a display 37, for example, a digital mirror device (DMD) or an LCD display, and an associated optical unit 39, for reflecting information or data for an observer into the partial beam path 9A of the surgical microscope 1 via the beam splitter prism 15A. In the other partial beam path 9B, a camera adapter 19 with a camera 21 fixed thereto is arranged at the interface 13D, the camera being equipped with an electronic image sensor 23, for example, with a CCD sensor or a CMOS sensor. An electronic and in particular a digital image of the tissue region 3 can be captured via the camera 21.

A binocular tube 27 is adjacent to the interface 13 on the observer side. The binocular tube has two tube objectives (29A, 29B), which focus the respective parallel beam (9A, 9B) onto an intermediate image plane 31, that is, image the observation object 3 onto the respective intermediate image plane (31A, 31B). The intermediate images situated in the intermediate image planes (31A, 31B) are finally imaged in turn toward infinity by eyepiece lenses (35A, 35B), such that an observer can observe the intermediate image with a relaxed eye. Moreover, a magnification of the distance between the two partial beams (9A, 9B) is carried out in the binocular tube via a mirror system or via prisms (33A, 33B) in order to adapt the distance to the interocular distance of the observer. In addition, image erection is carried out by the mirror system or the prisms (33A, 33D).

The surgical microscope 1 is equipped with an illumination device, via which the object field 3 can be illuminated with broadband illumination light. For this purpose, the illumination device in the present embodiment has a white light source 41, for instance a halogen incandescent lamp or a gas discharge lamp. The light emerging from the white light source 41 is directed via a deflection mirror 43 or a deflection prism in the direction of the object field 3 in order to illuminate the latter. The illumination device furthermore contains an illumination optical unit 45 that provides for uniform illumination of the entire observed object field 3.

It should be pointed out that the illumination beam path illustrated in FIG. 1 is highly schematic and does not necessarily reproduce the actual course of the illumination beam path. In principle, the illumination beam path can be embodied as so-called oblique illumination, which is closest to the schematic illustration in FIG. 1. In such oblique illumination, the beam path runs at a relatively large angle (6° or more) with respect to the optical axis of the objective 5 and can run completely outside the objective, as illustrated in FIG. 1. Alternatively, however, there is also the possibility of allowing the illumination beam path of the oblique illumination to run through a region of the objective 5. A further possibility for the arrangement of the illumination beam path is the so-called 0° illumination, wherein the illumination beam path runs through the objective 5 and is coupled into the objective between the two partial beam paths (9A, 9B), along the optical axis of the objective 5 in the direction of the object field 3. Finally, there is also the possibility of embodying the illumination beam path as so-called coaxial illumination containing a first and a second illumination partial beam path. The partial beam paths are coupled into the surgical microscope via one or a plurality of beam splitters parallel to the optical axes of the observation partial beam paths (9A, 9B), such that the illumination proceeds coaxially with respect to the two observation partial beam paths.

In the surgical microscope illustrated in FIG. 1, the illumination can be influenced. By way of example, a filter 47 can be introduced into the illumination beam path, which allows only a narrow spectral range from the broad spectrum of the white light source 41 to pass through, for example, a spectral range which can excite fluorescence of a fluorescent dye situated in the object field 3. For observing the fluorescence, filters (37A, 37B) can be introduced into the observation partial beam paths, which filters filter out the spectral range used for exciting the fluorescence, in order to be able to observe the fluorescence.

The illumination device can additionally be equipped with a unit for changing the illumination light source. The latter is indicated in FIG. 1 by a system for exchanging the white light source 41 for a laser 49. With a laser as light source, in particular with an infrared laser, for example, laser Doppler imaging or laser speckle imaging is made possible in conjunction with a suitable image sensor 23.

In the embodiment variant of the surgical microscope 1 shown in FIG. 1, the objective 5 consists only of one achromatic lens. However, an objective lens system having a plurality of lenses can also be used, in particular a so-called varifocal objective, which makes it possible to vary the working distance of the surgical microscope 1, that is, the distance between the object-side focal plane and the vertex of the first object-side lens surface of the objective 5, also called front focal length. The object field 3 arranged in the focal plane is also imaged toward infinity by the varifocal objective 50, such that a parallel beam is present at the observer side.

Figure 2:
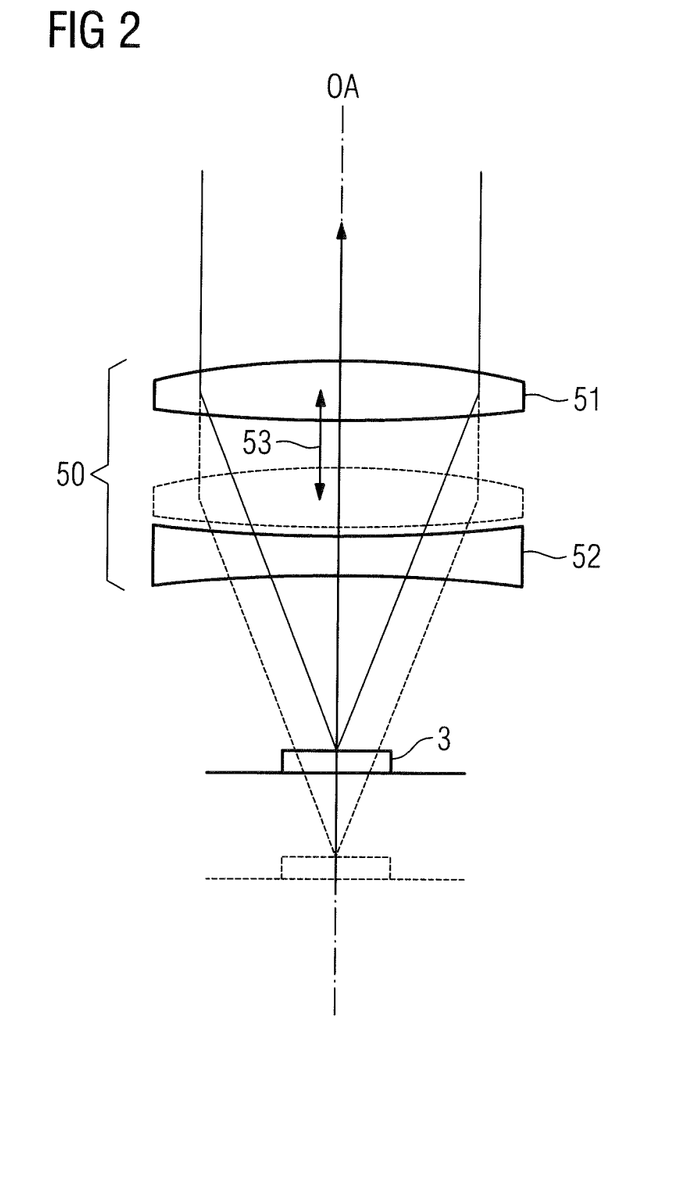
FIG. 2 shows a varifocal objective which can be used in the surgical microscope according to the invention.

One example of a varifocal objective is illustrated schematically in FIG. 2. The varifocal objective 50 includes a positive element 51, that is, an optical element having positive refractive power, which is illustrated schematically as a convex lens in FIG. 2. Furthermore, the varifocal objective 50 includes a negative element 52, that is, an optical element having negative refractive power, which is illustrated schematically as a concave lens in FIG. 2. The negative element 52 is situated between the positive element 51 and the object field 3. In the varifocal objective 50 illustrated, the negative element 52 is arranged in a fixed fashion, or else the positive element 51 is arranged displaceably along the optical axis OA as indicated by the double-headed arrow 53. If the positive element 51 is displaced into the position illustrated by dashed lines in FIG. 2, the front focal length is lengthened, such that the working distance of the surgical microscope 1 from the object field 3 changes.

Although the positive element 51 is embodied in a displaceable fashion in FIG. 2, in principle there is also the possibility of arranging the negative element 52, instead of the positive element 51, movably along the optical axis OA. However, the negative element 52 often forms the terminating lens of the varifocal objective 50. A stationary negative element 52 therefore affords the advantage that the interior of the surgical microscope 1 can be sealed more easily against external influences. Furthermore, it should be noted that, although the positive element 51 and the negative element 52 are illustrated as individual lenses in FIG. 2, each of these elements can also be realized in the form of a lens group or a cement element instead of in the form of an individual lens, for example in order that the varifocal objective is embodied in an achromatic or apochromatic fashion.

Figure 3:
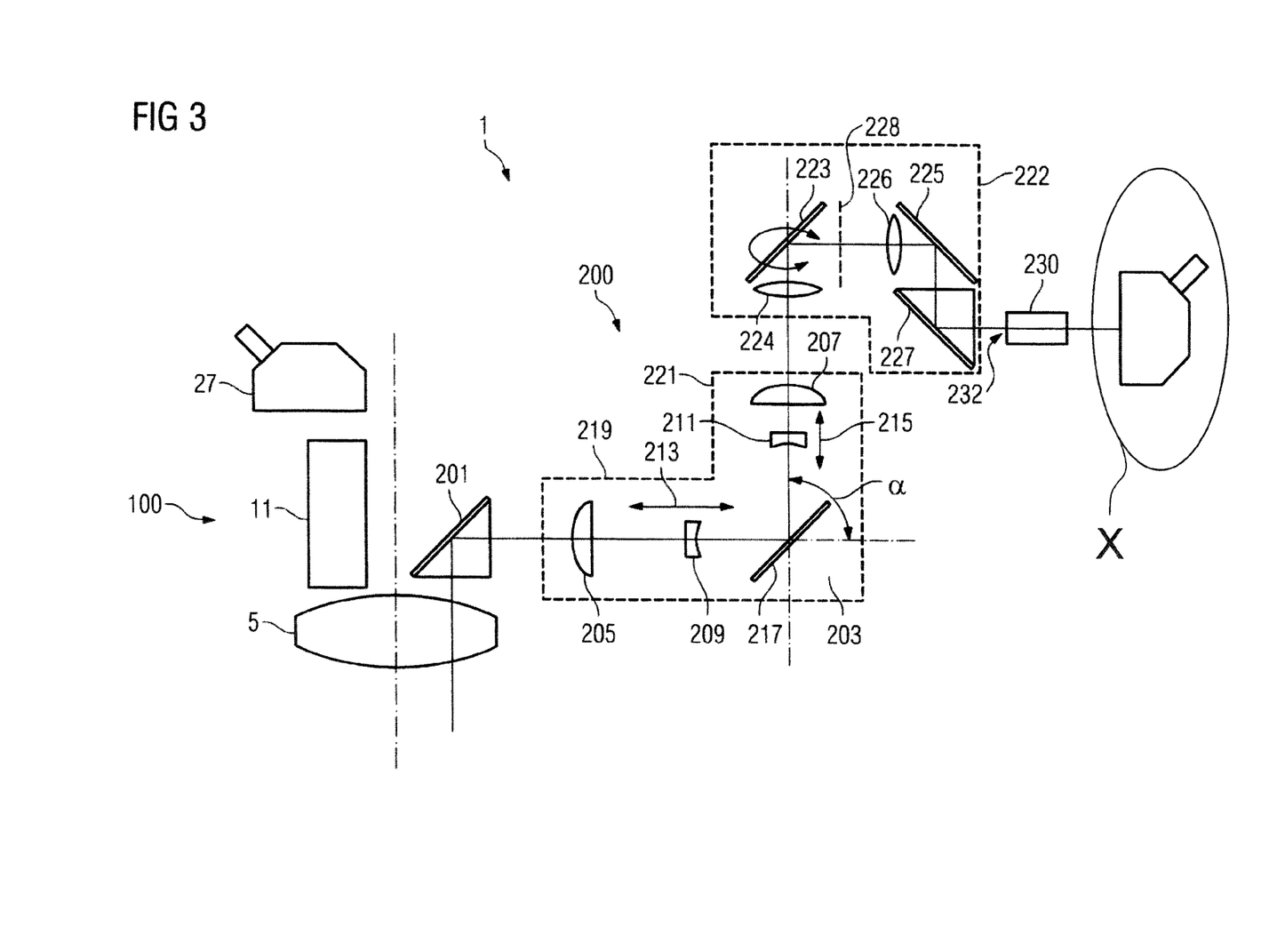
FIG. 3 shows the main observer beam path and the co-observer beam path of a stereomicroscope according to the invention in a schematic for a face-to-face observation position.

FIG. 3 shows the main observer beam path 100 and the co-observer beam path 200 of a surgical microscope embodied as a stereomicroscope according to the invention. The main observer beam path 100 substantially contains the optical components described with reference to FIG. 1, of which only the zoom system and the binocular tube 27 are illustrated highly schematically in FIG. 3, for the sake of clarity. It goes without saying that the other optical elements described with reference to FIG. 1 can likewise be present in the main observer beam path. Only one of the right and left zoom systems is discernible in the main observer zoom system 11 in a manner governed by the illustration. In actual fact, however, the main observer zoom system is a zoom system including a right and a left stereo channel (11A, 11B) such as was described with reference to FIG. 1. The binocular tube, too, in terms of the embodiment of its optical components, substantially corresponds to the binocular tube described with reference to FIG. 1.

The co-observer beam path 200 is coupled out from the beam emerging through the main objective 5 behind the common main objective 5. For this purpose, in the present embodiment, use is made of a deflection prism 201 that folds the optical axis of the co-observer beam path. The deflection prism constitutes a geometrical beam splitter since it feeds to the co-observer beam path 200 a beam spatially separated from the stereoscopic partial beams (9A, 9B) of the main observer beam path. Instead of the deflection prism 201 used in the specific embodiment, a reflector of some other type, for example a plane mirror, can also be used as the geometrical beam splitter.

A co-observer zoom system 203, which is embodied as a folded zoom system in the present embodiment, is adjacent to the deflection prism 201 in the co-observer beam path 200. The zoom system 203 in the present embodiment includes four lenses or lens groups (205, 207, 209, 211), of which the outer lenses or lens groups 205 and 207 have a positive refractive power and the inner lenses or lens groups (209, 211) have a negative refractive power. In addition, the inner lenses (209, 211) are arranged displaceably along their respective optical axis, as is indicated by the double-headed arrows (213, 215).

The outer lens or lens group 205 and the outer lens or lens group 207 are incorporated in a stationary fashion, that is, in an immobile fashion, in the folded zoom system 203. Moreover, they are identical in terms of their lens parameters but arranged in mutually opposite orientations in the folded zoom system 203. The inner lenses or lens groups (209, 211) in each case have a negative refractive power and are likewise embodied identically in terms of their lens parameters and incorporated in mutually opposite orientations in the folded zoom system 203. In addition, in contrast to the outer lenses or lens groups (205, 207), they are arranged displaceably along their respective optical axis. By displacing the inner lenses or lens groups (209, 211), it is possible to vary the magnification factor made available by the zoom system 203.

The zoom system illustrated in FIG. 3, as a folded zoom system, is equipped with a reflector 217. The latter subdivides the folded zoom system 203 into an input arm 219 and an output arm 221. The optical axes of the input arm 219 and of the output arm 221 form a folding angle α, which is 90 degrees in the present embodiment, but can also have a different angle value>0 degrees. The angle value is preferably in the angular range of 45 degrees to 180 degrees and can be in particular in the angular range of 75 degrees to 120 degrees. In this case, the folding angle indicates by what angle a beam entering through the input arm of the folded zoom system emerges from the output arm of the zoom system 203 in a manner deflected from its original direction. In the present embodiment, the folding angle is 90 degrees.

The folded zoom system 203 is embodied as a large zoom system. That is, that each of its lenses has a diameter such that it acts on both partial beams of the binocular tube 231 in every orientation of the stereo base that is settable with the aid of the rotatable deflection mirror 223 for the stereoscopic partial beams. What is achieved as a result is that the orientation of the stereo base accords with the set position of the co-observer.

Although the lenses 205 to 211 of the folded zoom system are illustrated as individual lenses in the present embodiment, they can also made of a group of lenses instead of individual lenses, wherein the two central lens groups (209, 211) are displaceable along their respective optical axes. There is also the possibility of embodying the individual lenses or individual lenses of the lens groups as kit elements in order to optimally correct image aberrations. In this case it is advantageous, however, if the above-explained symmetry of the lenses or lens groups is maintained in the folded zoom system.

In the present embodiment, an intermediate imaging system 222 including a first converging lens or a first converging lens system 224 and a second converging lens or a second converging lens systems 226 is adjacent to the folded zoom system 203. The use of converging lens systems has the advantage over individual lenses that generation of imaging aberrations can largely be avoided with the aid of the lens systems. In the present embodiment, therefore, converging lens systems (224, 226) are used, which are illustrated only symbolically as lenses for the sake of clarity in FIG. 3.

Figure 4:
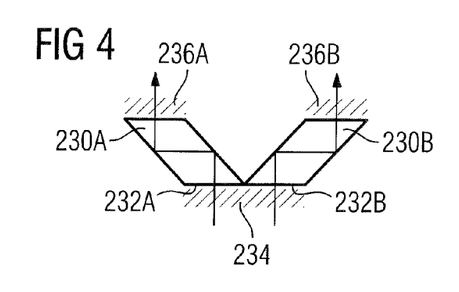
FIG. 4 shows a splitter for separating stereoscopic partial beams in a plan view.
Figure 5:
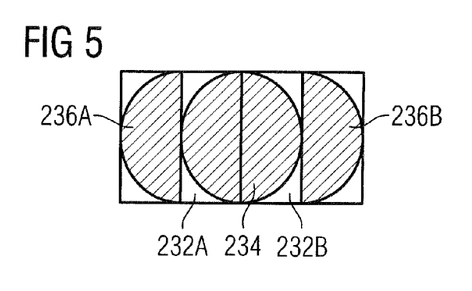
FIG. 5 shows the splitter from FIG. 4 in a view of the input end of the splitter; and, FIG. 6 shows the stereomicroscope from FIG. 3 in the case of a lateral observation position.

The first converging lens system 224 images the observation object 3 observed with the surgical microscope 1 onto an intermediate image plane 228. With the aid of the second converging lens system 226, the intermediate image situated in the intermediate image plane 228 is then imaged toward infinity again, in order that it can be fed to a binocular tube 231. With the aid of the intermediate imaging system 222, the device pupil situated within the large zoom system, preferably in the center of the zoom system or in direct proximity to the center of the zoom system, is imaged onto the input end 232 of a splitter 230 for separating the stereoscopic partial beams. In the present embodiment, the splitter 230 is realized by two rhombic prisms (230A, 230B) arranged directly alongside one another and the input end 232 of the splitter 230 is realized by the input ends (232A, 232B) of the rhombic prisms (230A, 230B). A plan view of the rhombic prisms (230A, 230B) and a view of the input ends (232A, 232B) of the rhombic prism (230A, 230B) are shown in FIGS. 4 and 5. These two figures additionally illustrate the splitting of the device pupil on the basis of the device pupil 234 imaged onto the input ends (232A, 232B) of the rhombic prisms (230A, 230B) and the pupils of the two stereoscopic partial beam paths that are present at the output ends (238A, 238B) of the rhombic prisms (230A, 230B). The imaging of the device pupil onto the input end 232 of the splitter 230 makes it possible to avoid vignetting.

On account of the additional intermediate image in the intermediate image plane 228 in comparison with the main observer beam path 100, image erection has already taken place in the co-observer beam path 200 at the input of the binocular tube 231, such that it is possible to dispense with a prism system for image erection in the binocular tube of the co-observer beam path 200. However, it is often advantageous if a binocular tube structurally identical to the main observer beam path can be used in the co-observer beam path 200, for example, in order to reduce the number of different assemblies and thus the production costs of the stereomicroscope. In the present embodiment, therefore, the intermediate imaging system 222 has an image erecting system 227 downstream of the second converging lens systems 226 and upstream of the splitter 230, such that the image at the input of the binocular tube 231 of the co-observer beam path 200 is directed in the same way as at the input of the binocular tube 231 of the main observer beam path 100. In the present embodiment, therefore, a binocular tube structurally identical to the binocular tube in the main observer beam path can be used in the co-observer beam path. In the present embodiment, a roof prism is used as image erecting system 227. In the present embodiment, a deflection prism or a deflection mirror 225 is additionally situated between the image erecting system 227 and the splitter 230 in order to compensate for the deflection of the main observer beam that takes place in the image erecting system 227.

Although the image erecting system 227 is illustrated as part of the intermediate imaging system 222 in the present embodiment, it need not necessarily be part of the intermediate imaging system 222. By way of example, an image erecting system 227 situated between the splitter 230 and the binocular tube 231 can alternatively be present. However, arranging the image erecting system 227 in the intermediate imaging system 222 has the advantage that the stereoscopic partial beams are not yet separated and a single image erecting system 227 therefore suffices.

In the intermediate imaging system 222, a deflection mirror 223 that is rotatable about the optical axis of the output arm 221 of the folded zoom system 203 is situated between the first converging lens system 224 and the intermediate image plane 228. All optical elements, including the binocular tube 231, that are adjacent to the rotatable deflection mirror 223 are mounted together with the deflection mirror 223 rotatably about the optical axis of the output arm 221 of the folded zoom system 203. By rotating the deflection mirror 223 together with the optical elements adjacent to the rotatable deflection mirror 223, it is possible to vary the position of the co-observer with respect to the position of the main observer in a wide range.

Figure 6:
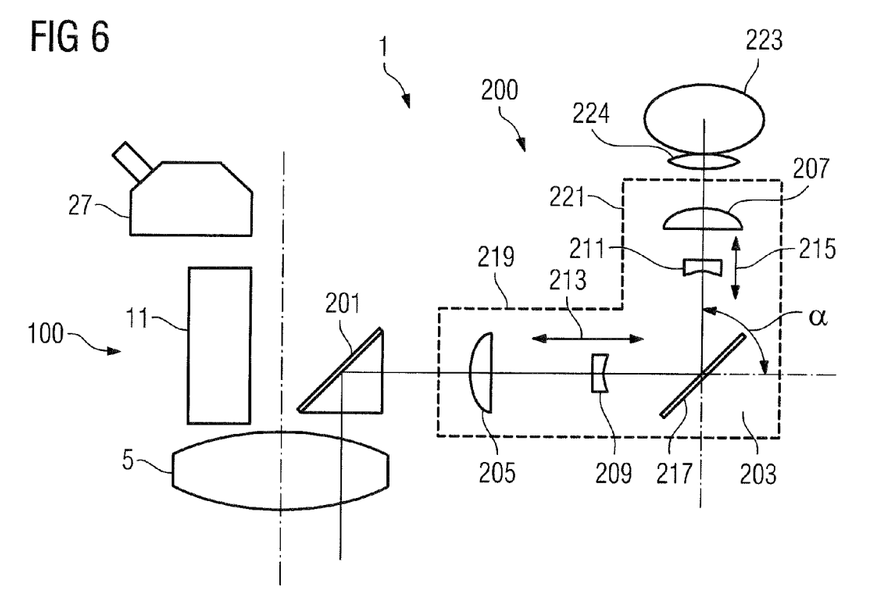

In the rotational position—illustrated in FIG. 3—of the rotatable subsystem of the co-observer beam path, the subsystem being formed from the rotatable deflection mirror 223 and the optical elements, including the binocular tube 231, that are adjacent to the rotatable deflection mirror 223, the co-observer is situated in a face-to-face position with respect to the main observer. FIG. 6, which does not illustrate the optical elements, including the binocular tube 231, that succeed the rotatable deflection mirror 223 for the sake of clarity, shows, on the basis of the deflection mirror 223, a rotational position of the rotatable subsystem in which the co-observer is situated laterally with respect to the main observer. It goes without saying that the orientation of the deflection mirror 223 and thus of the rotatable subsystem rotated by 180 degrees relative to the orientation from FIG. 6 is also possible. It is likewise possible for the co-observer to assume arbitrary intermediate orientations between the orientation shown in FIG. 6 and the orientation rotated by 180 degrees with respect thereto. In this case, the co-observer has the possibility of being positioned arbitrarily in an angular range of 180 degrees. It should be pointed out at this juncture that the angular range of 180 degrees does not necessarily specify the maximum angular range available for the positioning of the co-observer. If permitted by structural details of the stereomicroscope, the co-observer can also move closer to the main observer beyond the orientation of the deflection mirror 223 as shown in FIG. 6. It is likewise possible for the co-observer to move closer to the main observer on the other side of the stereomicroscope. As stated, limits are imposed here merely by the structural embodiment of the stereomicroscope. Since the splitting of the beam into stereoscopic partial beams takes place only after the deflection of the beam by the deflection mirror 223, the associated correct image orientation is also offered to the co-observer in every possible position.

Figure 7:
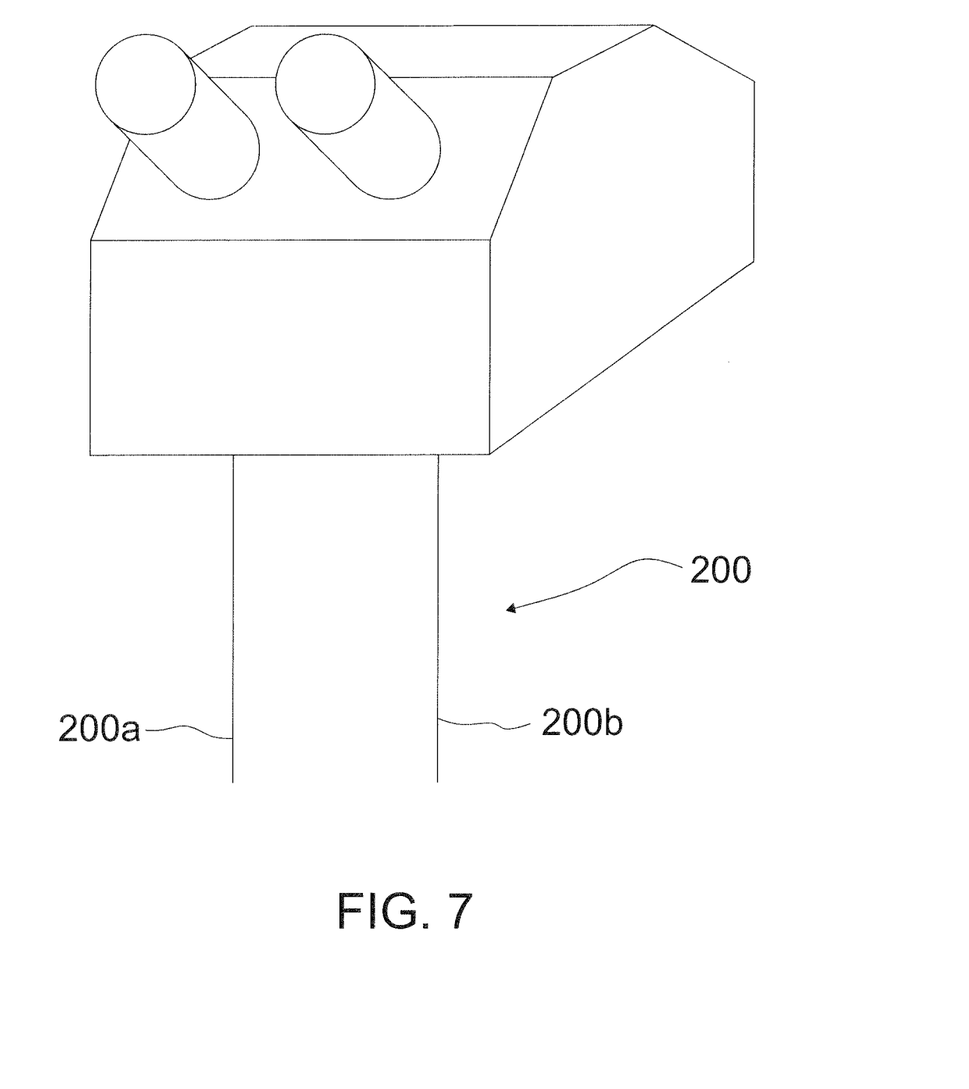
FIG. 7 is a perspective view of the detail X of FIG. 3.

FIG. 7 shows the detail X of FIG. 3 in a perspective view. FIG. 7 shows the first stereoscopic co-observer partial beam 200a and the second stereoscopic co-observer partial beam 200b entering the binocular tube of the co-observer beam path 200.

It is understood that the foregoing description is that of the preferred embodiments of the invention and that various changes and modifications may be made thereto without departing from the spirit and scope of the invention as defined in the appended claims.

LIST OF REFERENCE NUMERALS

1 Surgical microscope
3 Operation field/tissue region/object field
5 Objective
7 Divergent beam
9 Beam
9A, 9B Stereoscopic partial beam path
11 Main observer zoom system
11A, 11B Magnification changer
13A, 13B Interface arrangement
15A, 15B Beam splitter prism
19 Camera adapter
21 Camera
23 Image sensor
27 Binocular tube
29A, 29B Tube objective
31A, 31B Intermediate image plane
33A, 33B Prism
35A, 35B Eyepiece lens
37 Display
37A, 37D Fluorescence filters
39 Optical unit
40A, 40B Spectral filter
41 White light source
43 Deflection mirror
45 Illumination optical unit
47 Spectral filter
49 Laser
50 Varifocal objective
51 Positive element
52 Negative element
53 Displacement path
100 Main observer beam path
200 Co-observer beam path
200a First stereoscopic co-observer partial beam
200b Second stereoscopic co-observer partial beam
201 Deflection prism
203 Co-observer zoom system
205 Lens or lens group
207 Lens or lens group
209 Lens or lens group
211 Lens or lens group
213 Displaceability
215 Displaceability
217 Reflector
219 Input arm
221 Output arm 222 Intermediate imaging system
223 Deflection mirror
224 Converging lens system
225 Deflection element
226 Converging lens system
227 Deflection element
228 Intermediate image plane
230A, 230B Rhombic prism
231 Binocular tube
232A, 232B Input end
234 Imaging of the device pupil
236A, 236B Pupil of a stereoscopic partial beam path
238A, 238B Output end

What is claimed is:

1. A stereomicroscope comprising:
a stereoscopic main observer beam path having a main observer zoom system;
a stereoscopic co-observer beam path having a co-observer zoom system and being configured to have a first stereoscopic co-observer partial beam and a second stereoscopic co-observer partial beam pass therealong;
a main objective common to said main observer beam path and said co-observer beam path;
a geometrical beam splitter arranged between the main objective and the main observer zoom system;
said co-observer beam path being coupled out from the main observer beam path via said geometrical beam splitter;
said co-observer zoom system being disposed in said co-observer beam path downstream of said geometrical beam splitter; and,
said co-observer zoom system including a plurality of lenses having dimensions configured so as to cause both said first and said second stereoscopic co-observer partial beams to pass through each of said lenses.

2. The stereomicroscope of claim 1, wherein:
said main observer zoom system includes a first and a second partial zoom system;
said stereoscopic main observer beam path is configured to have a first and a second stereoscopic main partial beam pass therealong;
said first stereoscopic main partial beam defines a first stereoscopic main partial beam path;
said second stereoscopic main partial beam defines a second stereoscopic main partial beam path;
said first partial zoom system is arranged in said first stereoscopic main partial beam path so as to have said first stereoscopic main partial beam pass therethrough; and,
said second partial zoom system is arranged in said second stereoscopic main partial beam path so as to have said second stereoscopic main partial beams pass therethrough.

3. The stereomicroscope of claim 1 further comprising:
a beam deflector;
said co-observer zoom system having an input arm and an output arm and defining an optical axis folded via said beam deflector by a folding angle (a) of greater than zero;
said optical axis in the output arm and said optical axis in the input arm enclosing said folding angle (a);
said co-observer zoom system having at least three lenses;
at least two of said lenses being arranged displaceably along said folded optical axis;
at least one of said at least three lenses being arranged in said input arm; and,
at least one of said at least three lenses being arranged in said output arm.

4. The stereomicroscope of claim 3, wherein said folding angle (a) lies in the range of 45° to 180°.

5. The stereomicroscope of claim 3 wherein:
said co-observer zoom system has a first, a second, a third and a fourth lens arranged one behind another along said folded optical axis;
said first and said second lenses of said co-observer zoom system are arranged in the input arm of said co-observer zoom system; and,
said third and said fourth lenses of said co-observer zoom system are arranged in the output arm of said co-observer zoom system.

6. The stereomicroscope of claim 5, wherein said second lens and said third lens are arranged between said first and fourth lenses in the direction of said optical axis; and,
said second lens and said third lens are configured to be displaceable along said folded optical axis.

7. The stereomicroscope of claim 5 wherein:
said first lens and said fourth lens are identical lenses; and,
said second and said third lens are identical lenses.

8. The stereomicroscope of claim 7, wherein:
said fourth lens is oriented oppositely to said first lens; and,
said third lens is oriented oppositely to the second lens.

9. The stereomicroscope of claim 3 further comprising a reflector configured to be rotatable about said optical axis in said output arm; and, said reflector being arranged downstream of said co-observer zoom system.

10. The stereomicroscope of claim 1, wherein said main observer zoom system is an extended zoom system.

11. The stereomicroscope of claim 1 further comprising:
a splitter disposed in said co-observer beam path;
said splitter having an input end and being configured to separate said first and second stereoscopic partial beams of said co-observer beam path;
an intermediate imaging system arranged between said co-observer zoom system and said splitter; and,
said intermediate imaging system being configured to image a device pupil of said co-observer beam path onto said input end of said splitter.

12. The stereomicroscope of claim 11, wherein said intermediate imaging system includes a first converging lens or a first converging lens system, a second converging lens or a second converging lens system, and an intermediate image plane situated between said first converging lens or said first converging lens system and said second converging lens or said second converging lens system.

13. The stereomicroscope of claim 11, wherein said intermediate imaging system includes an image erecting system.

14. A stereomicroscope comprising:
a first optics arrangement defining a stereoscopic main observer beam path and including a main observer zoom system;
a second optics arrangement defining a stereoscopic co-observer beam path configured to have a first stereoscopic co-observer partial beam and a second stereoscopic co-observer partial beam pass therealong;
said second optics arrangement including a co-observer zoom system;
a main objective common to said main observer beam path and said co-observer beam path;
a geometrical beam splitter arranged between the main objective and the main observer zoom system;

said co-observer beam path being coupled out from the main observer beam path via said geometrical beam splitter;

said co-observer zoom system being disposed in said co-observer beam path downstream of said geometrical beam splitter; and, said co-observer zoom system including a plurality of lenses having dimensions configured so as to cause both said first and said second stereoscopic co-observer partial beams to pass through said lenses.

* * * * *

UNITED STATES PATENT AND TRADEMARK OFFICE
CERTIFICATE OF CORRECTION

PATENT NO. : 9,715,097 B2
APPLICATION NO. : 14/749358
DATED : July 25, 2017
INVENTOR(S) : Hoegele et al.

It is certified that error appears in the above-identified patent and that said Letters Patent is hereby corrected as shown below:

In the Specification

In Column 7:
Line 12: delete "13D" and substitute -- 13B -- therefor.

In Column 7:
Line 30: delete "33D" and substitute -- 33B -- therefor.

In Column 12:
Line 41: delete "37D" and substitute -- 37B -- therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*